(12) United States Patent
Desai et al.

(10) Patent No.: US 9,115,996 B2
(45) Date of Patent: Aug. 25, 2015

(54) THREAT ANALYSIS TOOLKIT

(75) Inventors: Uday N. Desai, Fort Worth, TX (US); John M. Williams, Weatherford, TX (US); Russell G. Torti, Southlake, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1173 days.

(21) Appl. No.: 12/511,476

(22) Filed: Jul. 29, 2009

(65) Prior Publication Data

US 2011/0029234 A1 Feb. 3, 2011

(51) Int. Cl.
| | | |
|---|---|---|
| *G05D 1/00* | (2006.01) | |
| *G01C 23/00* | (2006.01) | |
| *G01C 3/00* | (2006.01) | |
| *G01S 13/06* | (2006.01) | |
| *G08G 5/00* | (2006.01) | |

(52) U.S. Cl.
CPC *G01C 23/00* (2013.01); *G01C 3/00* (2013.01); *G01S 13/06* (2013.01); *G05D 1/00* (2013.01); *G08G 5/003* (2013.01); *G08G 5/006* (2013.01); *G08G 5/0039* (2013.01); *G08G 5/0047* (2013.01); *G08G 5/0078* (2013.01)

(58) Field of Classification Search
CPC ...... G01C 21/20; G01C 23/00; G01C 23/005; G01C 3/00; G09B 9/003; G05D 1/00; G05D 1/0088; G05D 1/0202; G05D 1/0212; G05D 1/042; G05D 1/0808; G05D 1/101; G05D 1/12; G05D 1/0055; G01S 13/06; G01S 13/5242; G01S 13/58; G01S 13/66; G01S 13/726; G01S 13/94; G08G 5/003; G08G 5/0047; G08G 5/0039; G08G 5/006; G08G 5/0078; G08G 5/0069; G08G 5/0021; G06K 9/6218
USPC ........... 701/4, 5, 6, 9, 14, 411, 3, 10, 11, 410, 701/418, 467, 416, 519, 300, 301; 340/945, 340/961, 967; 348/169, 170, 171, 172; 382/103
See application file for complete search history.

(56) References Cited

U.S. PATENT DOCUMENTS

| | | | | |
|---|---|---|---|---|
| 4,060,830 | A * | 11/1977 | Woolfson | 348/171 |
| 4,812,990 | A | 3/1989 | Adams et al. | |
| 4,947,350 | A * | 8/1990 | Murray et al. | 702/181 |
| 5,321,406 | A * | 6/1994 | Bishop et al. | 342/32 |
| 5,526,260 | A * | 6/1996 | Kodet et al. | 702/2 |
| 5,537,119 | A * | 7/1996 | Poore, Jr. | 342/96 |
| 5,594,450 | A * | 1/1997 | Schober | 342/159 |
| 5,631,640 | A * | 5/1997 | Deis et al. | 340/961 |
| 5,635,662 | A * | 6/1997 | Robertson et al. | 89/1.11 |
| 5,838,262 | A * | 11/1998 | Kershner et al. | 340/945 |
| 6,078,849 | A * | 6/2000 | Brady et al. | 701/28 |
| 6,097,996 | A * | 8/2000 | Deker | 701/10 |
| 6,172,747 | B1 * | 1/2001 | Houlberg | 356/139.04 |
| 6,182,007 | B1 * | 1/2001 | Szczerba | 701/423 |
| 6,196,496 | B1 * | 3/2001 | Moskovitz et al. | 244/3.15 |

(Continued)

*Primary Examiner* — Thomas G Black
*Assistant Examiner* — Sze-Hon Kong
(74) *Attorney, Agent, or Firm* — Bracewell & Giuliani LLP

(57) ABSTRACT

A method and system for managing an aircraft's flight path by identifying and categorizing potential threats in the aircraft's original flight path and determining an alternate flight path. The alternate flight path is selected from potential flight paths and has a threat value lower than any of the potential flight paths. The potential flight path candidates are generated from combinations of the original flight path coordinates, and coordinates that vary from the original coordinates by a set range.

13 Claims, 6 Drawing Sheets

(56) References Cited

U.S. PATENT DOCUMENTS

| | | | |
|---|---|---|---|
| 6,204,799 B1* | 3/2001 | Caputi, Jr. | 342/25 R |
| 6,222,464 B1* | 4/2001 | Tinkel et al. | 340/945 |
| 6,260,759 B1* | 7/2001 | Nguyen et al. | 235/411 |
| 6,317,690 B1* | 11/2001 | Gia | 701/301 |
| 6,347,313 B1* | 2/2002 | Ma et al. | 707/711 |
| 6,421,603 B1 | 7/2002 | Pratt et al. | |
| 6,424,889 B1* | 7/2002 | Bonhoure et al. | 701/3 |
| 6,466,158 B1* | 10/2002 | Munger | 342/95 |
| 6,529,821 B2* | 3/2003 | Tomasi et al. | 701/467 |
| 6,577,947 B1 | 6/2003 | Kronfeld et al. | |
| 6,694,228 B2* | 2/2004 | Rios | 701/2 |
| 6,784,408 B1* | 8/2004 | Cheung et al. | 250/201.9 |
| 6,801,156 B1* | 10/2004 | Wasiewicz | 342/95 |
| 6,845,938 B2* | 1/2005 | Muravez | 244/3.11 |
| 6,937,746 B2* | 8/2005 | Schwartz | 382/103 |
| 7,071,867 B2* | 7/2006 | Wittenberg et al. | 342/70 |
| 7,193,557 B1* | 3/2007 | Kovacich et al. | 342/89 |
| 7,194,353 B1* | 3/2007 | Baldwin et al. | 701/528 |
| 7,236,121 B2* | 6/2007 | Caber | 342/62 |
| 7,248,952 B2* | 7/2007 | Ma et al. | 701/25 |
| 7,280,897 B2* | 10/2007 | Allstadt et al. | 701/9 |
| 7,440,588 B2* | 10/2008 | Kaneko et al. | 382/103 |
| 7,447,593 B2* | 11/2008 | Estkowski et al. | 701/301 |
| 7,474,332 B2* | 1/2009 | Byren | 348/169 |
| 7,555,383 B2* | 6/2009 | Siegel | 701/519 |
| 7,589,646 B2* | 9/2009 | Glover | 340/963 |
| 7,693,653 B2* | 4/2010 | Hussain et al. | 701/416 |
| 7,734,411 B2* | 6/2010 | Gremmert | 701/528 |
| 7,848,879 B2* | 12/2010 | Herman | 701/411 |
| 7,970,532 B2* | 6/2011 | Tehan et al. | 701/423 |
| 8,010,244 B2* | 8/2011 | Allstadt et al. | 701/9 |
| 8,086,351 B2* | 12/2011 | Gaudiano et al. | 700/253 |
| 8,116,527 B2* | 2/2012 | Sabol et al. | 382/103 |
| 8,265,337 B2* | 9/2012 | Yu et al. | 382/103 |
| 8,527,118 B2* | 9/2013 | Jones et al. | 701/11 |
| 2004/0068372 A1 | 4/2004 | Ybarra et al. | |
| 2005/0216182 A1* | 9/2005 | Hussain et al. | 701/200 |
| 2007/0139252 A1 | 6/2007 | Barry et al. | |
| 2007/0198143 A1 | 8/2007 | Ybarra et al. | |
| 2007/0253639 A1* | 11/2007 | Statter | 382/276 |
| 2009/0157233 A1* | 6/2009 | Kokkeby et al. | 701/3 |
| 2009/0282122 A1* | 11/2009 | Patel et al. | 709/207 |
| 2010/0195868 A1* | 8/2010 | Lu | 382/103 |
| 2010/0235088 A1* | 9/2010 | Li et al. | 701/201 |
| 2010/0274487 A1* | 10/2010 | Neff et al. | 701/302 |
| 2012/0290152 A1* | 11/2012 | Cheung et al. | 701/2 |

* cited by examiner

THREAT ANALYSIS TOOLKIT

BACKGROUND

1. Field of Invention

The present disclosure relates generally to a method of assessing a total threat for a flight path.

2. Description of Prior Art

Methods exist for assessing threats associated with a given flight path. One example of an assessment algorithm defines mission success using the formula—Mission Success = A0*Rm*S*Pk*Pd*Pc*Pe*Pwk.

Where:
- A0: Mission Availability,
- Rm: Mission Reliability,
- S: Probability of Survival,
- Pk: Probability to Kill the Target,
- Pd: Probability of detection,
- Pc: Probability of Engagement, and
- Pwk: Probability of Weapon to achieve the desired level of Kill.

Modeling the Ship as a Weapon System", Green, John, 69th MORS Symposium, Annapolis, Md., June 2001.

The method requires the processing of a large amount of information, complex (hypothesis based) algorithm, special high speed computer resources, and on-board sensors. For real-time application, the algorithm will compute, update, and display the information of Pms (probability of mission success) assessment values. This can be a very complex and intensive mathematical operation.

Another example of an assessment algorithm uses time based position valves, such as azimuth, elevation, and altitude, to model radar threats as point sources. Point source evaluation however provides only a single position assessment which can provide error since a threat from a radar is typically part of a distributed threat system. Moreover, a full flight path threat assessment may become unnecessary if the flight path is altered or new threats are encountered. As such, single position value based threat assessments do not properly represent a realistic threat assessment that can in turn reduce ownship survivability and affect Pms.

Prior to aircraft take-off, a pilot is typically assigned a mission plan. having fly path waypoints (sometimes referred to as mission waypoints). Mission types include, deep air support (DAS), mission for special operations, reconnaissance, bombing, attack, and support. Typically an aircraft (herein refer also as ownship) follows a mission plan and flies its intended fly-path, passing predetermined waypoints. Waypoints are sometimes referred to as mission waypoints. The distance between two consecutive mission waypoints can often be relatively large. At the mission onset it is assumed the pilot will proceed on a mostly straight line path between adjacent mission waypoints. However this is subject to change due to the nature of the mission plan, terrain, and/or conditions that may be encountered.

Ownship vulnerability from ground based radar threats can be computed using current position data to compute the presented radar cross section (RCS) signature. Knowing the ownship radar receiver signal to noise minimum (SNR min) value, the maximum detectable free space range is computed while the slant range to the radar threat is computed from the positional data. If the slant range exceeds the SNR min range the probability of detection $P_d$ is 0, otherwise the $P_d$ value is set at its default, which is 1. $P_d$ has been calculated using threat radar parameters and slant range, the total $P_d$ is from all known threats is calculated from its current position and displayed to a pilot or mission planner. When the ownship reaches the next waypoint, the process can be repeated with new $P_d$ values determined and displayed. The threat assessment however is only useful at the fixed positions and at the instantaneous ownship spatial orientations. RCS and $P_d$ plots (polar plots) are typically displayed along the flight path with the radar threat positions.

SUMMARY OF INVENTION

Disclosed herein is a method of managing a flight path of an aircraft subject to a threat. In an embodiment the method includes receiving threat data, receiving flight path data, computing a dynamic waypoint along the flight path based on threat data, recomputing threat data based on the location of the dynamic waypoint, determining if values of the threat data exceed acceptable values of threat data, and indicating a flight path to the computed dynamic waypoint if the acceptable values of threat data exceed the values of the threat data. The method can include recalculating ownship position and recomputing the waypoints, threat data, and flight path. The method described herein includes an option of identifying individual threats from the threat data that can be represented by a single threat; forming a threat cluster with the individual identified threats, and using the formed threat cluster in repeated recalculations. The method can also include computing a centroid from the maximum and minimum values of the cluster threat data; and creating threat values for each threat based on centroid values and comparing the threat values to acceptable threat values. Recomputing waypoints can include generating candidate waypoints that vary within a range from the previous flight path. Threat values for each candidate waypoint can be assessed and the candidate waypoint having the lowest assessed threat value can be identified. In an embodiment, the candidate waypoints are generated from all combinations of the original waypoint coordinates, coordinates greater than the original waypoint coordinates, and coordinates less than the original waypoint coordinates. The greater than and the less than coordinates can vary from the original waypoint coordinates by a set amount. The can also include visually displaying threat data, where selected threat data is displayed.

Also disclosed is a system for managing a flight path of an aircraft subject to a threat In an example the system includes a processor configured to receive threat data, receive flight path data, compute a dynamic waypoint along the flight path based on threat data, recompute threat data based on location of dynamic waypoint, determine if the threat values exceed the acceptable threat values, and indicate a flight path to the computed dynamic waypoint if the acceptable threat values exceed the threat values.

BRIEF DESCRIPTION OF DRAWINGS

Some of the features and benefits of the present invention having been stated, others will become apparent as the description proceeds when taken in conjunction with the accompanying drawings, in which.

Figure 1:
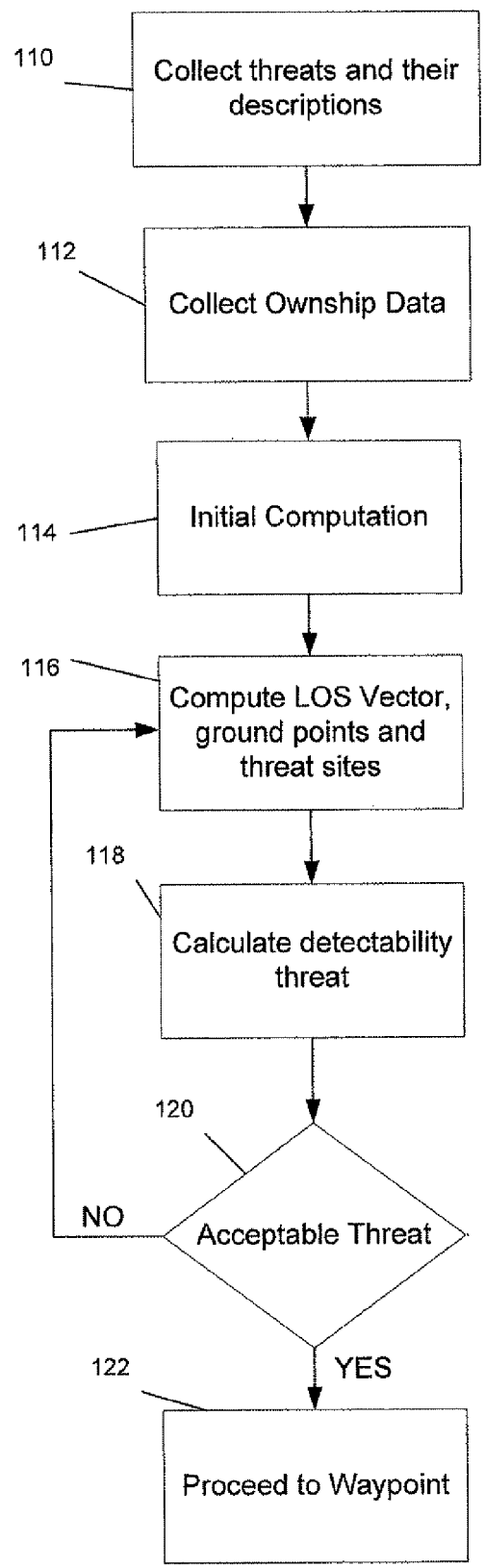
FIG. 1 is a flowchart depicting a method described herein.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the present disclosure is therefore to be limited only by the scope of the appended claims.

Disclosed herein is a method of performing threat assessment using a Threat Analysis Tool (TAT) algorithm. The algorithm can be included with a system and/or a method of detecting, recognizing and intercepting continuously, threat-radars' assessment along a mission flight path to an aircraft operator without cluttering the display. An advantage of the present disclosure provides a pilot the ability to recognize the presence of a threat's vulnerability based on ownship's detection by the threat-radar along the entire route, selected and even in the presence of terrain bounced jamming signals.

For the purposes of discussion herein, a cluster, in an embodiment, is a group of points defining an area of interest and as such indicates the number of individual objects contained within the outline. A cluster can have three values: (1) a centroid, as defined in an embodiment herein, is a geometric center of a plane figure, in other embodiments, the centroid can be an average or central tendency of a data set; (2) Maximum value, in an embodiment, is the largest distance from the centroid to a point on the cluster; and (3) Minimum value, in an embodiment, is the shortest distance from the centroid to a point on the cluster.

The distance between two mission waypoints can be estimated and computed using present aircraft-speed at the first waypoint and the coordinates of two waypoints. The TAT algorithm can also estimate the time it will take to react to a pop-up threat. In a default value, this time is equal to the average flight time to cover 10 miles of distance at current speed. The measured parameter values may depend on; aircraft-type, sensor-type, threat-type, terrain-type, environmental conditions, and mission-type.

In an embodiment, computation of free-space range defines ownship vulnerability from ground based radar threats and can be computed using current position data which presents radar cross section (RCS) signature to the threat. Knowing the ownship radar receiver signal-to-noise ratio (SNR), and its minimum ($SNR_{min}$) value, the maximum detectable free-space range can be computed and using a line-of-sight (LOS) vector. The range of the radar threat can be computed from the ownship positional data and threat site location.

In one example, if the slant range exceeds the $SNR_{min}$ free space range, the probability of detection Pd is set at 0, otherwise the Pd value is set to its default, 1. All slant ranges of every threat site having a Pd value of 1 are used for any future processing. This process can be conducted at each waypoint. This approach saves processing time. The pilot can select any threat site of interest, even a threat site that did not meet above described criteria. In such a case, that site is added to TAT's stored threat site data.

Threat site Pd values of all selected threat sites can be recalculated using threat radar parameters and the slant range from the ownship's current position. In one example this can be done for all known threats. The Pd values may be made available to an aircraft operator, pilot, and/or stored. Ownship's present position is a default position used by TAT in absence of a designated waypoint position. When the ownship reaches the next waypoint, the process can be repeated with new Pd values determined and available. The pilot can designate inside the TAT algorithm, the initiation and termination waypoints, which are defined as the ownship's current and final positions, respectively. The threat assessment however is only useful at the fixed positions and at the instantaneous. RCS and Pd plots (polar plots) may be displayed along the flight path with the radar threat positions.

FIG. 1 is a flowchart representing a method of navigating through a flight path. Step 110 involves collecting potential threats and a description of the threats. As discussed above, the threats may comprise radar systems, either ground based or airborne, as well as other aircraft or ships. The descriptions include the threat position such as latitude, longitude, and altitude. The type of the threat such as ground based radar system or air based radar system. Other descriptors include known or estimated threat parameters such as transmission power frequency polarization and other detection specifications. Surrounding conditions, such as terrain and atmospheric conditions may also be included in the descriptor data. The threats may be identified with a reference number such as T1, T2, etc.

Also included in the method in FIG. 1 is step 112, which in an example involves collecting ownship data; and optionally, if available, terrain, and environmental data. Ownship data can include kinematics data such as aircraft heading, speed, speed limits, gravitational forces (g's), velocity, position, latitude, longitude, altitude, bearing, as well as onboard sensor limits, transmission power, frequency, and radar cross section. The waypoints of the particular mission may also be provided in this step, including the waypoint attributes of latitude, longitude, and altitude. A tolerable probability of detection by the pilot (PdHold), selection of flight path segment, and number of waypoint perturbations, can be input at this time. In one example, PdHold is set at 0.5, azimuth parameter is perturbed and three perturbations of azimuth are made.

In step 114 an initial computation can be performed, where in one embodiment a simulated waypoint is identified that is a distance from the first established waypoint. In this embodiment, the first established waypoint is the actual starting point of the mission. Thus, the first mission or simulated waypoint will be past the first actual waypoint. In one example, the first simulated waypoint is chosen so that it is reachable by the aircraft up to about 10 seconds from the time the first actual waypoint is reached. Simulated waypoints are computed (their quantity and location (latitude, longitude, altitude) which are added to mission waypoints. Also a threat site total number for TAT assessment is selected. An algorithm is provided in Appendix A illustrating an example of computing the number of waypoints K. Additionally, if the number of waypoints is found to be less than two, then the pilot will be alerted and a display is projected illustrating the respective positions of the aircraft and the threat.

Still referring to FIG. 1, LOS vectors, ground-points, and a cluster of the threat site may be computed in step 116. In this example, LOS vectors are computed using volumetric perturbations at the waypoint; where a perturbation is defined as a small change (percentage change) from its measured value of the parameter. In step 116, LOS is a vector from the waypoint position to the threat site having three measured parameters; azimuth, elevation and range. This vector may be represented as LOS (Azm, Elm, Rngm): where Azm is an azimuth parameter's measurement value; Elm is an elevation parameter's measured value; and Rnmg is the measured value for the slant range parameter. In an embodiment, the LOS vector parameters are perturbed and a new LOS vector (LOSnew) is computed using perturbed values as LOSnew(Azp, Elp, Rngm), where Azp is the perturbed value of azimuth parameter, and Elp is the perturbed value of elevation parameter. In one example, the perturbed values range from +/−0.3% of the azimuth and elevation parameter values. The perturbation creates two new LOS vectors; (1) LOSnew((Az+0.003×Az), Elm, Rngm), and (2) LOSnew((Az−0.003×Az), Elm, Rngm).

Two computed values may be used when computing ground points, they include (1) LOS1—LOS vector of measured parameters and (2) LOS2—LOS vector of perturbed parameters. Values for the LOS2 parameters slant range, the ground distance between LOS1 and LOS2, and the LOS2 vector latitude and longitude can be found by applying trigonometric identities. A cubic-spline technique can be utilized to compute coefficients of the fitted polynomial and the altitude at LOS2 ground-point. In the example of step 116, the ground-point always lies proximate the threat site. In this example, there are six ground-points in the vicinity of threat site 401. All these ground points are treated as a part of the threat site entity.

When computing a cluster, the latitude, longitude, and altitude of all ground-points can be grouped together and depicted by a geometric shape that best fits the grouping shape; example geometric shapes include a triangle, square, circle, trapezoidal, ellipse, etc. The area of the shape can also be computed. In one example, an optimum shape has a minimum computed area when compared to the area of all other possible "shapes". TAT stores this shape and associated ground-points designating the shape as a cluster. A centroid, minimum value, maximum value, and the area of the selected cluster can then be computed.

The threat to the waypoint Pd values can be calculated at step 118. In this example, SNR values are computed from LOS vectors and form SNR values. Also computed are LOS vector Pd values and cluster parameters (PdCentroid, PdMin, and PdMax). TAT stores Pd, LOS, threat site, cluster area, and the waypoint position data and uses PdMin, PdMax, and PdCentroid of cluster values to compute a new flight path.

In step 120, a maximum Pd value can be identified and compared to the PdHold value. If the PdMax is less than PdHold, no threat is posed by proceeding to the chosen simulated waypoint (step 122). If PdMax is about equal to or greater than PdHold, the LOS vector that contributes a maximum probability of detection is identified and a new flight path algorithm is performed (loop to step 116). An example of a new flight path algorithm is provided in Appendix A. Suggested waypoints are generated defining a new fly path having minimum deviations from the mission flight path and minimum Pd exposure. Also provided in Appendix A is a sample algorithm for computing each threat's Pd value. It should be pointed out however that the method described herein can be activated at any time, for any duration, and for any portion of a flight path. Activating the algorithm may be at the pilot's discretion.

Figure 2:
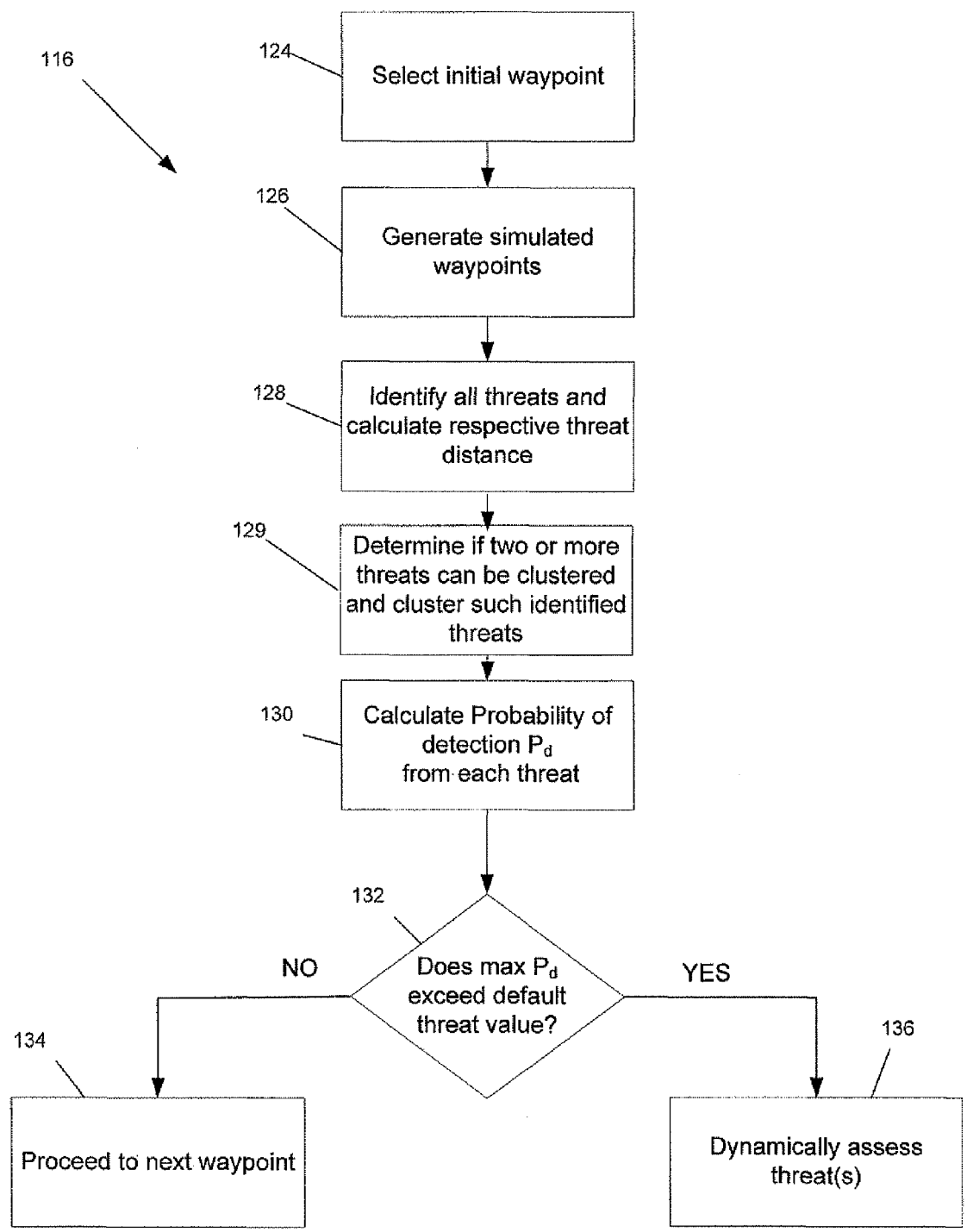
FIG. 2 is a flowchart of an embodiment of a portion of the method of FIG. 1.

FIG. 2 illustrates an example embodiment of step 116 from FIG. 1. In this example an initial waypoint is selected as shown in step 124 and simulated waypoints are generated (step 126). In step 128, all threats are identified and their respective threat distances calculated. Step 129 considers each threat's respective location to determine if two or more threats can be "clustered" and thus treated as a single threat. One clustering criteria is if all threats are within a 10 mile diameter circle. The cluster threat value is the highest threat value of the individual threat within the cluster. Consolidating two or more potential threats into a single cluster reduces analysis computational requirements and time, thus delivering faster results to the pilot. Advantages of the present method include amorphous clustering for reducing overhead and allowing comprehensive assessment vectors for the selected fly-path robustness. Based upon the presence and location of the threats the probability of detection Pd from each threat may be calculated as shown in step 130. As shown in step 132, if the max probability of detection exceeds a default threat value then the threats are dynamically assessed in step 136. Alternatively if Pd does not exceed the default threat value, the aircraft can proceed to the next waypoint (step 134).

Figure 3:
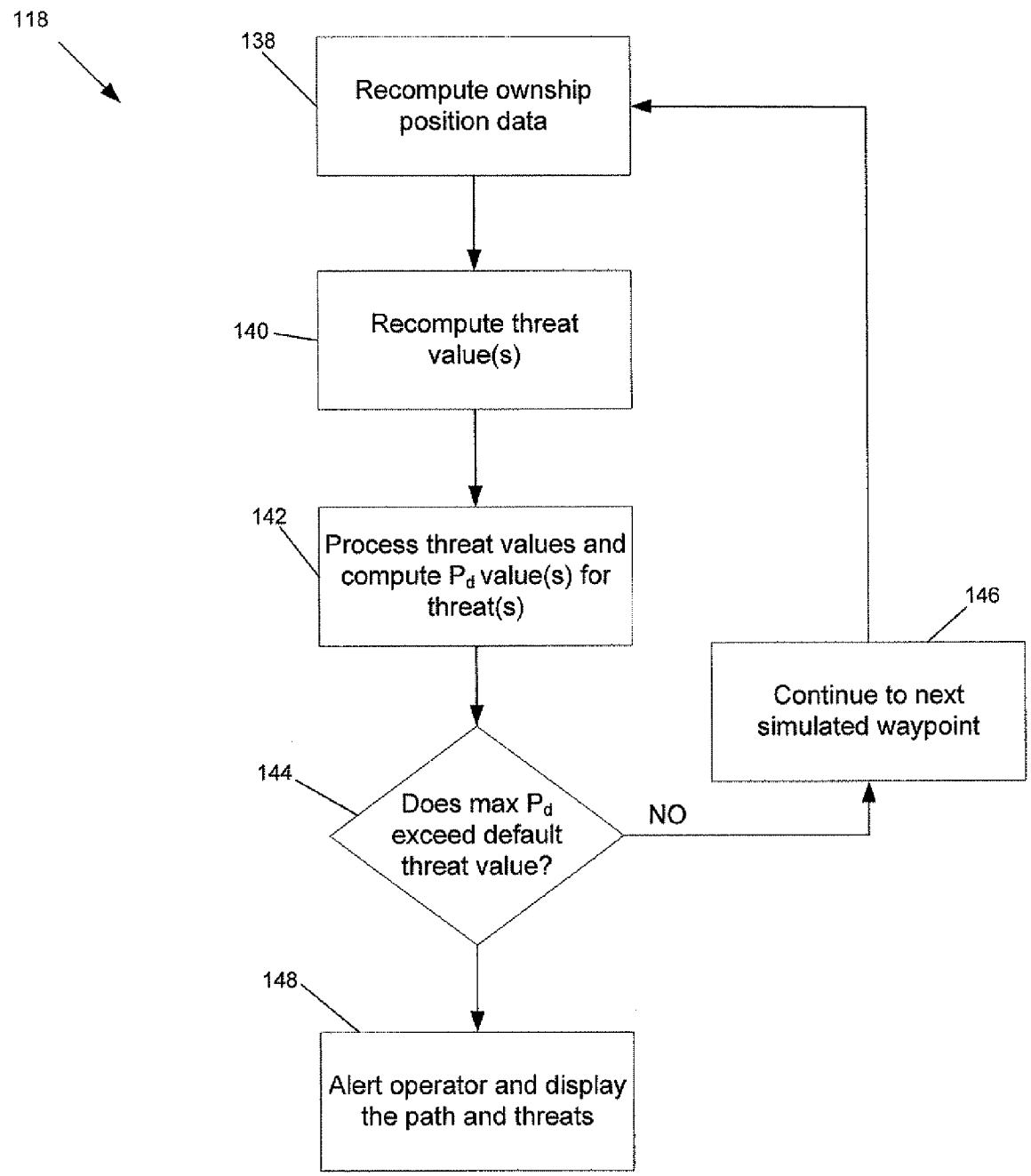
FIG. 3 is a flowchart of an embodiment of a portion of the method of FIG. 1.

With reference now to FIG. 3, an alternative example of step 118 is provided. Initially, the ownship position data is recomputed in step 138 and the threat data are recomputed in step 140 based upon the recomputed ownship position data. In step 142 threat values for each threat are computed. Step 144 asks if the maximum probability of detection exceeds the default threat value. If so, the pilot is alerted in step 148 and a new path is computed displayed along with the threats. If not, the method can proceed to step 146, and where it is continued to the next simulated way point. Computing a new or alternate path in response to an unacceptable threat level can include generating a list of candidate waypoints and assessing the detection threat for each candidate waypoint. A range value is assessed to each coordinate (Az, El., Alt.) of the original waypoint that is added and subtracted to and from the coordinate to obtain upper and lower range values. The candidate waypoints include combinations of the upper values, lower values, and original values. The candidate waypoint presenting the lowest probability of threat detection can be chosen as the next waypoint. If the threat is moving additional data considered can include range and range rate.

Figure 4:
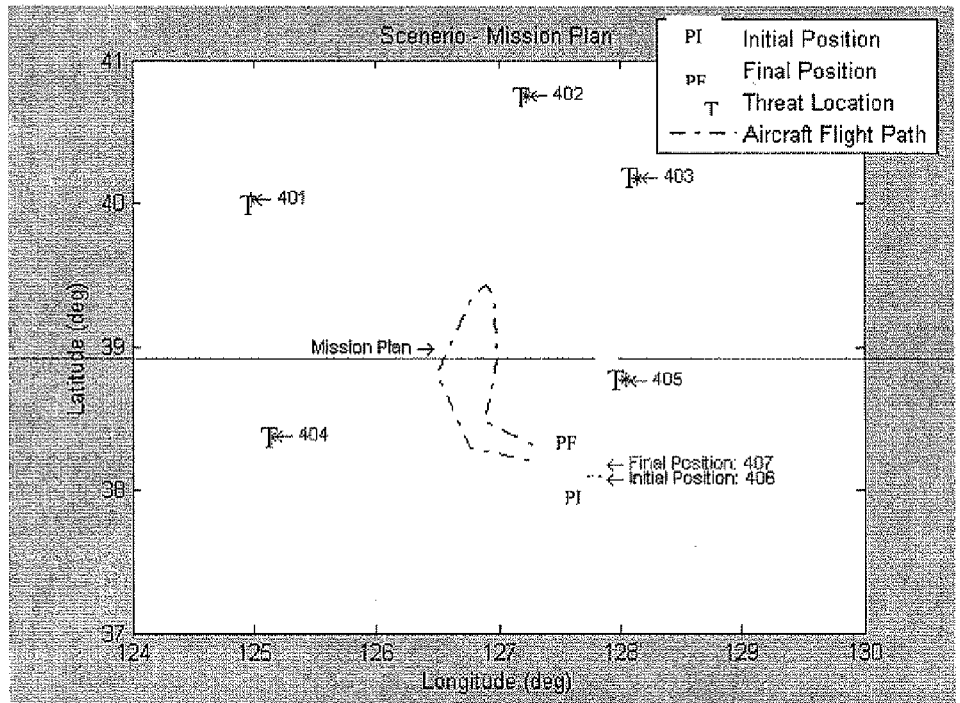
FIG. 4 displays examples of threats arranged by an assigned reference number and azimuth.

FIG. 4 graphically represents hypothetical threats and a mission plan both spatially arranged on a Cartesian coordinate plot by their respective longitude and latitude. The abscissa represents longitudes values and the ordinate represents latitudinal values. For example; threat site 401 is at a longitude of about 125° and at a latitude of 40°, threat site 402 is at a longitude of about 127° and at a latitude of 40.7°, threat site 403 is at a longitude of about 128° and at a latitude of 40° on the ordinate, threat site 404 is at a longitude of about 125° and at a latitude of 38.4° on the ordinate, and threat site 405 is at a longitude of 128° and at a latitude of 38.8° on the ordinate. Also depicted are the ownship aircraft's initial position 406 and the final position 407. Both 406 and 407 are at longitudinal values of 127.8°, 127.8°, on the ordinate and at latitudinal values 38.11°, 38.10° on the abscissa, respectively. Optionally, the threats graphically illustrated are limited to those that exceed a threat threshold value. The value can be input and established to regulate the number of items displayed. An example algorithm for setting the threshold value is in Appendix A. In this example a mission plan is shown as well as an initial position 406 and final position 407

Figure 5:
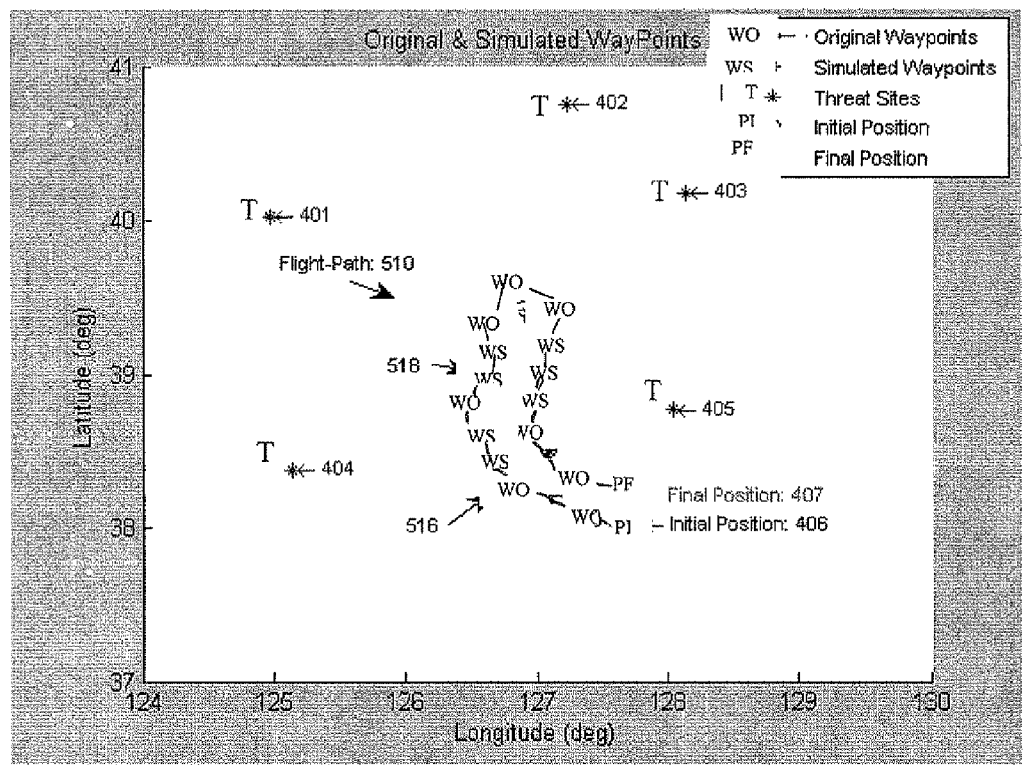
FIG. 5 graphically illustrates an example flight path with identified threats.

FIG. 5 graphically depicts an ownship flight path, mission plan waypoints, simulated waypoints, along with threat sites. For example, ownship flight path 510 with an original mission waypoint 516 at 126.7° longitude and 38.3° latitude. Further original mission waypoints are provided on the flight path 510 and represented as $W_O$. Also provided is a simulated waypoint 518 at 126.5° longitude and 38.8° latitude. Further simulated mission waypoints are provided on the flight path 510 and represented as $W_S$. Simulate waypoints are added upon the activation of the TAT algorithm. Threat sites 401, 402, 403, 404, and 405 are selected for assessment.

Figure 6:
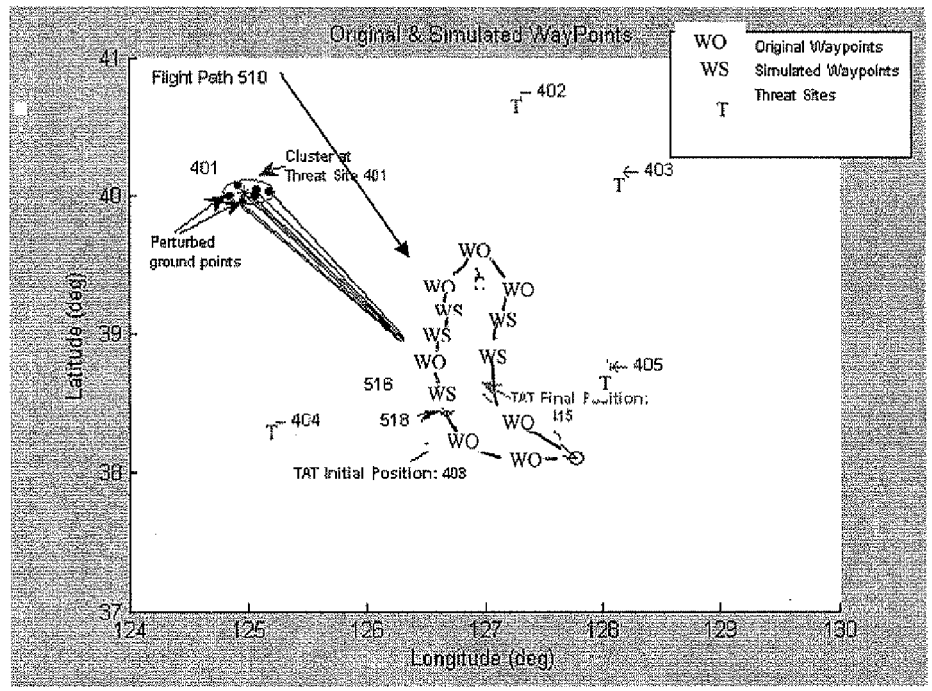
FIG. 6 charts example threats by azimuth and range.

FIG. 6 is a graphical illustration of ownship's volumetric perturbation and a flight-path segment process. Also provided are ground point locations, LOS generated shape, and area of the threat site of 401. As an example in FIG. 6, the groundpoints of threat site 401 are best fit into the shape of "ellipse". The area of an ellipse is computed as Pi*length of a semi-major axis*length of a semi-minor axis. In the example of FIG. 6, the pilot has activated the TAT algorithm and has selected the waypoints $W_O$ thereby defining flight path 510. A starting waypoint 403 for the flight path 510 is shown at 126.7° longitude and 38.3° latitude and an ending waypoint 415 is shown at 126.9° longitude and 38.7° latitude. The flight path 510 includes original waypoints, represented as $W_O$; and TAT generated simulated waypoints, represented by $W_S$. One original waypoint 516 is shown at 126.5° longitude and 38.8° latitudinal. A simulated waypoint 518 is shown at 126.5° longitude and 38.4° latitude. Also displayed are threat sites 401, 402, 403, 404, and 405.

An example of volumetric perturbation is illustrated in FIG. 6 where the flight path 510 is altered in response to threat site 401. As noted above, threat site 401 includes six groundpoints, these are located at 125.4°, 124.9°, 124.9°, 125.3°, 125.0°, 124.7° longitude and 40.2°, 39.5°, 39.4°, 39.0°, 40.5°, 39.8° latitude. Six LOS vectors, that each represent a specific ground-point, can now be generated along with their azimuth, elevation and range parameters. As an example: azimuths are 128.8°; 133.3°; 140°; 120°; 130°; 120°, and elevations are 2.3°, 2.1°, 2.1°, 2.9°, 2.2°, 2.3°; with respective ranges of 18; 19; 19; 16; 20; 19 km. Shaping of ground points to compute the area is as illustrated in FIG. 6, as an example: The ground points are fit to an ellipsoidal with a centroid located at 125.3° longitude and 39.7° latitude. The semi-major axis length is of unit length and the semi-minor axis is 0.4, and results in an area of about 1.4 km².

Figure 7:
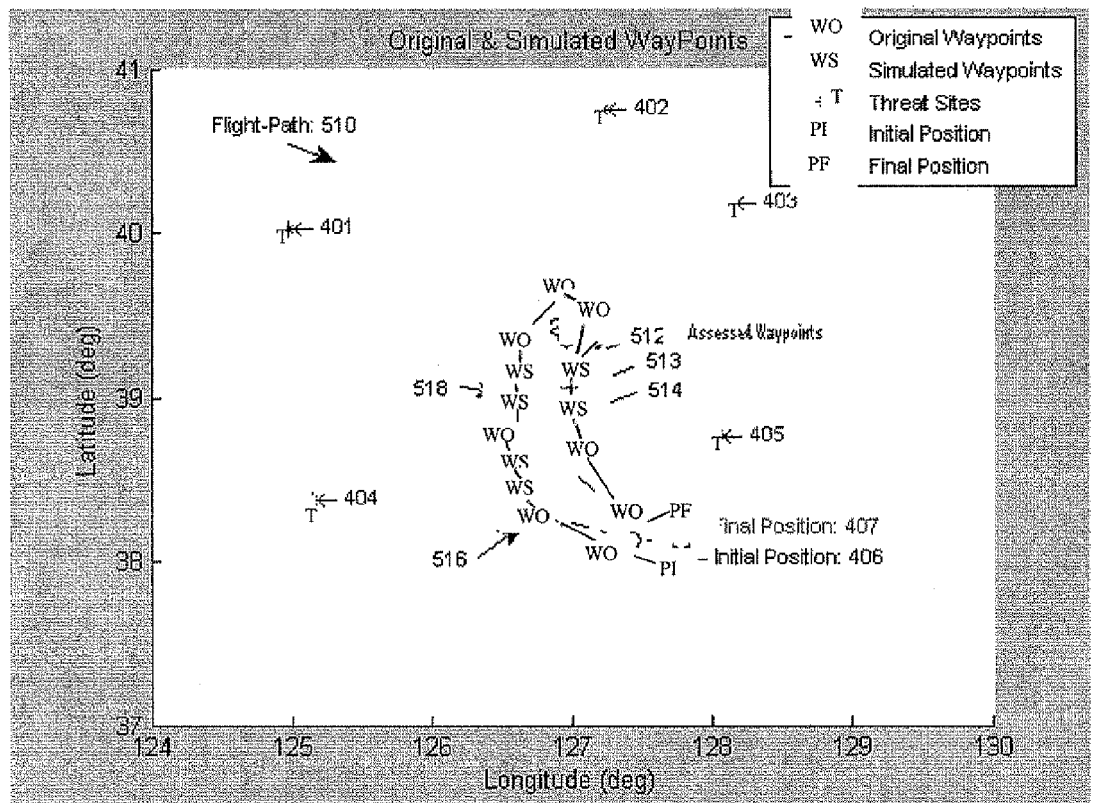
FIG. 7 graphically illustrates examples of TAT assessed waypoints and threat site.

FIG. 7 depicts a Cartesian plot of a flight path, threats, and waypoints. Waypoint 516 is illustrated as an original waypoint with designation $W_O$. TAT generated simulated waypoints, including waypoint 518, are represented with $W_S$. The mission plan flight path 510, starts at waypoint 406 which is where the TAT algorithm is initiated. Similarly, the final position waypoint 407 defines the flight path 510 termination location and where TAT algorithm computation ends. Simulated waypoints 512, 513, and 514, as noted above are generated by the TAT algorithm in response to threat sites 401, 402, 403, 404, and 405.

Figure 8:
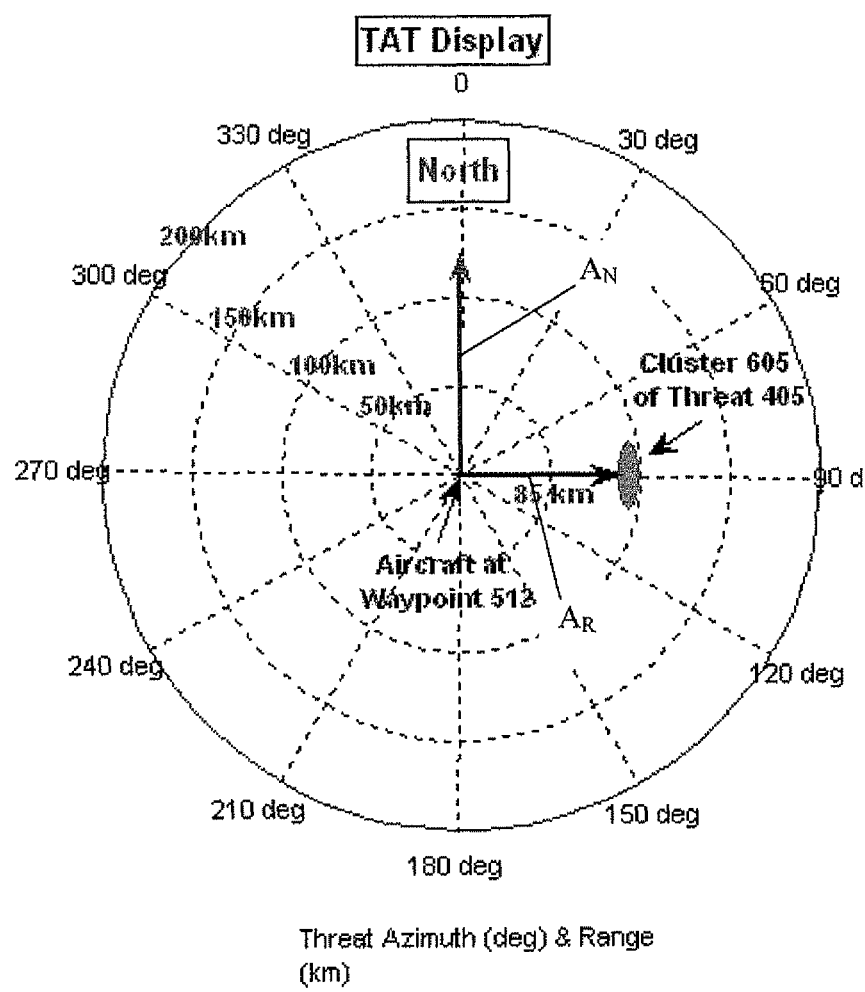
FIG. 8 provides an example of a TAT assessment Display.

A TAT display example shown in FIG. 8 azimuthally represents hypothetical threats with respect to ownship path depicting TAT threat assessment results for an entire flight path. In one embodiment the content of FIG. 8 is displayed for the pilot or other aircraft operator. The display includes 0° to 360° azimuth and range. Optional concentric circles marked as 50 km, 100 km, 150 km, and 200 km represent distance from ownship. Range as defined in this embodiment is the distance measured from the aircraft position at the waypoint to the threat site LOS. The plot displays an arrow $A_R$ identifying the location of a "potential" threat, In this example, the threat is identified as cluster area 605 of threat 405 and represented by an ellipsoid. The aircraft is shown as waypoint 512. A vector magnitude range is provided displaying 85 km (distance to threat 405) and direction 90° from north. North direction is shown by arrow $A_N$ shown oriented at 0°. The cluster may be colored (not shown), with the particular color representing a value of detectability. For example, red can represent a high detectability value; Pd=>07; orange may represent a medium detectability value; 0.7<Pd>0.5, and yellow can represent a low detectability value; 0.5<=Pd =>0.4. Optionally, other colors may be substituted for the listed colors, or additional colors included to represent increments between the listed levels of detectability. Yet further optionally, patterns (with colors, black and white, or combinations thereof) may be included to indicate detectability values of any range.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the method described herein can be applied to other craft and/or vehicles, such as automobiles, tanks, personnel carriers, water craft, such as boats, ships, and submarines, unmanned craft, such as drones, and the like. Thus a craft operator can be in the particular craft, or remote from the craft. These and other similar modifications will readily suggest themselves to those skilled in the art, and are intended to be encompassed within the spirit of the present invention disclosed herein and the scope of the appended claims.

Appendix A

Example Algorithm for Computing Number of Waypoints K.

Step 1:

Compute: Pd

Compute Pd at "First" designated Waypoint of the Flight-Path.

Compute Pd at "Next" Waypoint. "Next" Waypoint is defined as the Waypoint of the Flight-Path, after passing "First" Waypoint; also defined as "Second" Waypoint.

If Pdmax assessment value from threat/s = > PdHold then invoke_simulated_wpt_algorithm_flag == TRUE;

Go to Step 2

Else

Do not compute any simulated Waypoint

Step 2:
a) Compute: Tsec_wpt
Waypoint_First(lat, lon, alt) = Computed Coordinate of Waypoint "First" in Latitude, Longitude, Altitude
Waypoint_Second(lat, lon, alt) = Computed Coordinate of Waypoint "Second" in Latitude, Longitude, Altitude
Compute distance (dist_wpt) between Waypoint_First (lat, lon, alt) & Waypoint_Second (lat, lon, alt) of the Flight Path Tsec_wpt = dist_wpt / Aircraft_Speed;
b) Compute Time required to reach Simulated_Waypoint (K1);
K1 Waypoint is defined as:
Waypoint of the Flight-Path at a "Tsec_step" time interval of simulated flying (constant speed), from the "First" Waypoint, flying towards the "Second" Waypoint of the Flight Path.
Constant speed of the aircraft is defined as the speed of the aircraft at "First" Waypoint.
Tsec_step = const6; Flying time in seconds (const6 = 10 sec, default)
(Default value is the estimation made by the Pilot and is an input from Pilot. This value is assessed by quantifying abilities of the Pilot and the Aircraft to avoid incoming threat, using maneuverability.)
c) Compare:
If Tsec_wpt > Tsec_step
Kn = int{(Tsec_wpt / Tsec_step) − 1}
Simulated_Waypoint [K1] == at Tsec_step seconds;
After completing the simulated flying for Tsec_step from the "First" Waypoint to the "Second" Waypoint, using constant speed along the Flight-Path, the possibility and the location of the next simulated Waypoint is commenced.
If using comparison equation the need for "Third" Waypoint is confirmed then Simulated_Waypoint [K2] == at Tsec_step sec flying distance between
Simulated_Waypoint [K1] and Waypoint "Third" Waypoint.
Compute the LAST simulated Waypoint as Simulated_Waypoint [Kn] = at Tsec_step sec flying distance between Simulated_Waypoint [Kn−1] and Waypoint "Second"
Else
Simulated_Waypoint [K1] == at (Tsec_step/2) flying distance between Waypoint "First" and Waypoint "Second"
End
Envoke_simulated_wpt_algorithm_flag == TRUE; i.e. Evoke simulated waypoint algorithm;
Else
NO Need to compute any Simulated Waypoint/s.
If Envoke_simulated_wpt_algorithm_flag == FALSE
Simulated-Waypoint [K0] is Waypoint "First"
i.e. Simulated_Waypoint [K0] == Waypoint"First"
Simulated-Waypoint [K1] is Waypoint "Second"
i.e. Simulated_Waypoint [K1] == Waypoint "Second"
Simulated_Waypoint == 0; (simulated waypoints are not required)
end
END
Algorithm for computing threat values.
Threat ID#: Assign numbers (from 1 to n) to each threat presented to Pilot
Threats: T1...Tn
Ex: Threat1: T1
Ownship Waypoint:
Aircraft Position: K0 of flight-path. (K0 is defined as the first Waypoint on Flight Path)
Note: K0 can be "simulated Waypoint" or Waypoint of interest, as it depends on:
i) Aircraft position at initialization of TAT algorithm
ii) Pilot's selected position
Perturbations:
Assign number-ID to each position of threat after applying perturbations at K0
Ex: 9 Perturbed values: Az Values: (3), El Values: (3), Alt Values: (3)
Threat's assigned number-ID at K0 due to Aircraft Perturbation: [T1K0_001......T1K0_111];
Computed Ground_points:
T1K0_001: 1st perturbation generated a ground-point Gp1
T1K0_009: 9th perturbed value generated a ground-point; Gp9
Computed Ground_points:
[T1K0_001_Gp1, ....T1K0_009_Gp9]
Best-fit data into geometrical shape:
Best-fit data into geometrical shape:
Square_fit{ Ground_points}
Ellipse_fit{ Ground_points}
Circle_fit{ Ground_points}
Trapizoidal_fit{ Ground_points}.....
Compute minimum area of Best_fit:
shape =Min[area_Square_fit, area_ Ellipse_fit, area_Circle_fit, area_Trapizoidal_fit]
Compute shape (Cluster) parameters
Compute shape parameters:
shape_centroid = shape_centroid
shape_minimum_value = shape_min,
shape_maximum_value = shape_max
Compute shape_LOS vectors from the position of shape (cluster) parameters:
LOS_shape_centroid; LOS_shape_min, LOS_shape_max
Compute Pd values from shape_LOS:
shape[1]=Pd_shape_centroid,
shape[2]=Pd_shape_min,
shape[3]=Pd_shape_max
Rename as: PdT1K0_shape[1], PdT1K0_shape[2], and PdT1K0_shape[3]
Computed Pd values of each threat Positions:
Pd Array from Each Position: [PdT1K0_001....PdT1K0_009];

```
Check the Possibility of Cluster from Pd Values:
Pdmin=minimum ([PdT1K0_001....PdT1K0_009]; PdT1K0_shape)
Pdmax=maximum ([PdT1K0_001....PdT1K0_009]; PdT1K0_shape)
If cluster is present:
Pdcentroid = cluster [PdT1K0_001....PdT1K0_009]; PdT1K0_shape)
Else
Pdcentroid = Pd at Threat Position
END
Processing:
Threat_Cluster[1]: T1K0[Pdmin Pdmax Pdcentroid]
Threat_Cluster[n]: TnK0[Pdmin Pdmax Pdcentroid]
Compute Possibilities of Cluster from Ground Distance:
Compute ground distances among threats (T1...Tn) from K0:
K0Tgdist=[T1_dist,T2_dist,T3_dist, .... Tn_dist]
Compute ground separation:
K0T1gdist_diff=Abs([T1_dist − T2_dist, T1_dist − T3_dist,....T1_dist−Tn_dist]
K0T2gdist_diff=Abs([T2_dist − T3_dist, T2_dist − T4_dist,....T2_dist−Tn_dist]
K0T(n−1)gdist_diff=Abs([T(n−1)_dist−Tn_dist]
Compute Distance
deltaDist = (T1_dist) +/− (Constant/Tan(simulated perturbation));
deltaDist = const9;           (Ex: const9=5k ft, as default)
Note: deltaDist is the maximum ground distance between two threat sites.
It is an Heuristic value.
Cluster Close Proximity threat sites and Process:
Threat Proximity Cluster: Threat_Proximity_Cluster
K0T1_cluster if [element of [K0T1gdist_diff] <= deltaDist]
If K0T1_cluster == "Not Empty" then status == "Valid"
If status is "Valid", assign
K0T1_cluster an element of Threat_Proximity_Cluster.
Similarly examine
K0T2_cluster if [ element of [K0T2gdist_diff] <= deltaDist]
K0T(n−1)_cluster if [ element of [K0T(n−1)gdist_diff] <= deltaDist]
Note: Threat_Proximity_Cluster is the array of "Valid" K0Ts_cluster
Example:
If Only K0T3_cluster is "Valid" then Get parameters of K0T3_cluster
For example:
If threat sites; T3, T4 and T5 are the Cluster close proximity sites
then the Cluster is identified as K0T3 cluster
Accumulate for further processing following:
Threat_Cluster[3]: T3K0[Pdmin Pdmax Pdcentroid]
Threat_Cluster[4]: T4K0[Pdmin Pdmax Pdcentroid]
Threat_Cluster[5]: T5K0[Pdmin Pdmax Pdcentroid]
Process the Cluster site:
Threat_Proximity_Cluster_Pdmin =
min ([T3K0(1), T4K0(1), T5K(1)]
Threat_Proximity_Cluster_Pdmax =
max ([T3K0(2), T4K0(2), T5K(2)]
Threat_Proximity_Cluster_Pdcentroid =
centroid of ([T3K0(3), T4K0(3), T5K(3)]
Note:
Threat sites T3, T4, and T5 became entity of ONE cluster. TAT uses
This "cluster" as a simulated single threat site for further processing.
That is, cluster's computed Pdmin, and Pdmax values are treated as that of simulated threat site's parameters. And
declared as "Threat Site"
Processing Cluster
Check Threat_Proximity_Cluster_Pdmin value against PdHold and follow the previously defined logic.
Check Threat_Proximity_Cluster _Pdmax value against PdHold   and follow the previously defined logic.
Computing New Flight Path:
For example:
Let Computed Pd value at waypoint (Ke) from the threat site (T3) are as given by: [PdT1Ke_001,
....,PdT1Ke_009,PdT2Ke_001,... ....,PdTnKe_009] where,
Ke: is the waypoint;
T1...Tn: are threat site ID numbers;
Pd: is the computed value of the Probability of detection from its LOS vector;
001: is the first perturbation ID of a parameter;
PdMax_Ke=max(PdT1Ke_001,...PdT1Ke_009,PdT2Ke_001,........PdTnKe_009)
And if value of PdMax_Ke is > PdHold value then new fly path waypoint is computed
Let LOS_T1Ke_001 represents a LOS vector yielding PdT1Ke_001 valuation, and its parameters are azimuth
(defined as: azT1e_001) and elevation (defined as: elT1e_001).
Similarly using all Pd values and their corresponding LOS vectors at Ke;
Cluster_Aze=[azT1e_001,....,azT1e009, azTne_001,...,azTne 009]
Cluster_Elze=[elT1e_001,....,elT1e009,elTne_001,...,elTne_009]
Compute Ke[Azreq, Elreq] == minimum(RCS(Cluster_Aze; Cluster_Elze)) value
Similarly;
Compute Ke−1[Azreq, Elreq] == minimum(RCS(Cluster_Aze; Cluster_Elze)) value
Where; Ke−1 is the previous waypoint from Ke
New Fly Path of Ownship will have Azreq, and Elreq required angles with respect to T3 from its waypoint Ke. To
achieve this requirement, Ownship Proceeding from Ke−1 waypoint, follows Ke−1 [Azreq, Elreq] angles required
until it reaches the waypoint Ke with Ke[Azreq, Elreq] required angles with respect to T3.
```

Algorithm for Displaying Pd Values:
Concept/Description:
The computed assessment of Pd values needs to be displayed or stored for further processing. Displaying all values of Pd may clutter the pilot's view/display, especially if there are a large number of threat sites on the display. TAT suggests an algorithm for displaying Pd Values.
TAT uses Pilots' confidence-factor (PdHold). This factor largely depend on number of parameters, such as ability to handle threat; onboard countermeasures, onboard weapon's kill assessment, possibility of off-board support, type of aircraft, own ability to fly the aircraft, Mission importance, etc. PdHold is a single valued simulated parameter. The value can be inputted anytime during the Mission. TAT uses PdHold value to compare all Pd values of TAT algorithm assessment. Displays only assessed Pd values to the Pilot. This approach reduces the display-overhead; processing, cluttering, and time, and makes the TAT assessment robust.
Note: PdHold is pilot's discretion value.
Algorithm:
Step1:
Get Pd, and PdHold (default: PdHold = const4) values
Pd_Disply > PdHold;
Send Pd_Disply for Display Processor for Pilot's Display
Step2:
Pd <= PdHold
Eliminate Pd Values

20

Example Algorithm for Computing Number of Waypoints K.

```
Step 1:
Compute: Pd
     Compute Pd at Waypoint "First" and at Waypoint "Second".
     If Pdmax from any threat > PdHold then Envoke_pseudo_wpt_algorithm_flag == TRUE;
     Pseudo_Waypoint[K1] == at const5 sec flying distance between Waypoint "First" and Waypoint "second"
     (Ex: Valueof const5=5 sec )
Step 2:
Compute: tsec wpt
     Tsec_step = const6; Flying time in sec (Ex: const6 = 10 sec) between two pseudo waypoints.
     Waypoint_First(lat, lon, alt) = Waypoint " First"
     Waypoint_Second(lat, lon, alt) = Waypoint "Second"
     Compute distance (dist_wpt ) between Waypoint_First (lat, lon, alt) & Waypoint_Second (lat, lon,
alt);
     Tsec_wpt = dist_wpt / Aircraft Speed;
     If Tsec_wpt > Tsec_step
          (default value is selected. It is based on aircraft's minimum time required by the Pilot
          to avoid threat using aircraft maneuverability x const6); where const6 is a constant. Ex: 2
          If Tsec_wpt > const6: where const6 is constant value. Ex: 10
               Kn = int{(Tsec_wpt / Tsec_step) − 1}
               Pseudo_Waypoint [K1] == at Tsec_step sec flying distance between Waypoint
               "First" and Waypoint "second"
               Pseudo_Waypoint [K2] == at Tsec_step sec flying distance between
               Pseudo_Waypoint [K1] and Waypoint "Second"
               .......
               Pseudo_Waypoint [Kn] == at Tsec_step sec flying distance between
               Pseudo_Waypoint [Kn−1] and Waypoint "Second"
          Else
               Pseudo_Waypoint [K1] == at (Tsec_step/2) flying distance between Waypoint
               "First" and Waypoint "Second"
          End
     Envoke_pseudo_wpt_algorithm_flag == TRUE; i.e. Evoke pseudo waypoint algorithm;
Else
     If Envoke_pseudo_wpt_algorithm_flag == FALSE
          Pseudo-Waypoint [K0] is Waypoint "First" i.e. Pseudo_Waypoint [K0] == Waypoint
          "First"
          Pseudo-Waypoint [K1] is Waypoint "Second" i.e. Pseudo_Waypoint [K1] == Waypoint
          "Second"
          Pseudo_Waypoint == 0; (pseudo waypoints are not required)
     end
end
```

Example Algorithm for Computing Threat Values.

Threats: T1...Tn
Threat1: T1
Aircraft Position: K0 of flight-path. (K0 can be pseudo waypoint or Waypoint)
Aircraft Perturbed Positions: [T1K0_001......T1K0_111]
Pd Array from Each Position: [PdT1K0_001....PdT1K0_009];
Note - only 9 values are considered (3 values of Az, 3 values of E1, and 3 values of Alt : all from the present aircraft position).

```
Pdmin=minimum ([PdT1K0_001....PdT1K0_009])
Pdmax=maximum ([PdT1K0_001....PdT1K0_009])
Pdcentroid = cluster [PdT1K0_001....PdT1K0_009])
Threat_Cluster[1]: T1K0[Pdmin Pdmax Pdcentroid]
Threat_Cluster[n]: TnK0[Pdmin Pdmax Pdcentroid]
Compute spatial ground distance for threats (T1...Tn) from K0:
    K0Tgdist=[T1_dist,T2_dist,T3_dist, .... Tn_dist]
Compute ground separation:
    K0T1gdist_diff=Abs([T1_dist − T2_dist, T1_dist − T3_dist,.... T1_dist−Tn_dist]
    K0T2gdist_diff=Abs([T2_dist − T3_dist, T2_dist − T4_dist,.... T2_dist−Tn_dist]
    ....
    K0T(n−1)gdist_diff=Abs([T(n−1)_dist−Tn_dist])
Note:
    deltaDist is defined as a maximum ground separation allowed between adjacent sites
    deltaDist = (T1_dist) +/− (Constant/Tan(dynamic perturbation));
    deltaDist = const9; Ex:const9=5000 ft
Threat Proximity Cluster: Threat_Proximity_Cluster
    K0T1_cluster = [ element of [K0T1gdist_diff] <= deltaDist]
    If K0T1_cluster = "Not Empty" then status == "Valid"
    If "Valid" make K0T1_cluster as an element of Threat_Proximity_Cluster.
    .......
    K0T2_cluster = [ element of [K0T2gdist_diff] <= deltaDist]
    .......
    K0T(n−1)_cluster = [ element of [K0T(n−1)gdist_diff] <= deltaDist]
Threat_Proximity_Cluster is the array of "Valid" K0Ts_cluster
    Example: If Only K0T3_cluster is "Valid" then
        Get sites entities of K0T3_cluster
        For example: T3, T4 and T5 are entities of K0T3_cluster
        Call previously computed Arrays:
            Threat_Cluster[3]: T3K0[Pdmin Pdmax Pdcentroid]
            Threat_Cluster[4]: T4K0[Pdmin Pdmax Pdcentroid]
            Threat_Cluster[5]: T5K0[Pdmin Pdmax Pdcentroid]
    Threat_Proximity_Cluster_Pdmin =min ([T3K0(1), T4K0(1), T5K(1)]
    Threat_Proximity_Cluster_Pdmax =max ([T3K0(2), T4K0(2), T5K(2)]
    Threat_Proximity_Cluster_Pdcentroid =centroid of ([T3K0(3), T4K0(3), T5K(3)]
Note: At this juncture threat sites; T3, T4, and T5 are the part of ONE cluster and now the cluster Pdmin,
and Pdmax values can be examined.
Check Threat_Proximity_Cluster_Pdmin value against PdHold and follow the previously defined logic.
Check Threat_Proximity_Cluster _Pdmax value against PdHold and follow the previously defined logic.
```

Example Algorithm for Controlling Threshold Threat Value $P_d$Thrld.

```
Concept:
Rather than cluttering a display with each Pdmax value, a Pilot can choose a threshold value for the display. This
technique will help in reducing the total number of display-data.
PdThrld is the gated value which restricts all Pdmax values and its associated threats to be displayed to the pilot.
    Note: If pilot wants to see all Pdmax data then they are available for display also.
Two step process:
    Step1: Equation:
    Get PdThrld value for display; apriori input by the pilot. Selection based on his Work-Load.
    Default value is set at const4.
    Pd_Disply => PdThrld > PdHold; where PdThrld is a constant; const4; Ex: const4=0.7
    Step2: Priortizment:
    Pd_Disply Data are prioritized:
        Priority_one - Threat_Proximity_Cluster
        Priority_Two - Threat_Cluster
```

What is claimed is:

1. A method of managing a flight path of an aircraft subject to a threat, the method comprising the steps of:
   a. receiving threat data;
   b. receiving flight path data including a location of each of a plurality of preselected mission waypoints;
   c. computing a simulated waypoint along the flight path, the simulated waypoint located between two of the plurality of preselected mission waypoints;
   d. computing line of sight LOS vectors from the location of the simulated waypoint to locations of threats, each of the LOS vector having an azimuth parameter, an elevation parameter, and a range parameter;
   e. determining a probability of threat detection by the threat using the computed LOS Vector;
   f. creating a volumetric perturbation by, perturbing the parameters of Azimuth, elevation, and range to generate a plurality of perturbed LOS vectors each having one or more or all of its respective parameters of azimuth, elevation, and range having perturbed values;
   g. altering the flight path based on the volumetric perturbation;
   h. assigning a threat value from among each probability of threat detection by the threat determined using the computed LOS vector and each of the plurality of perturbed LOS vectors;
   i. determining if the maximum probability of threat detection value of the threat exceeds an acceptable probability of detection value of the threat; and
   j. if the maximum probability of threat detection value of the threat exceeds the acceptable probability of threat detection value, performing the step of generating, a list of a plurality of candidate waypoints.

2. The method as defined in claim 1, wherein the threat is a single threat, wherein the location of the threat is the location of the threat radar tor the single threat, the method further comprising the step of:
computing a volumetric probability of detection for the single threat for the simulated waypoint based upon the computed LOS vector to the location of the single threat and the generated plurality of perturbed LOS vectors each providing a perturbed location for the single threat.

3. The method as defined in claim 1,
wherein the threat is a first threat of a plurality of threats; and
wherein the method further comprises repeating steps (d) through (j) for each other of the of the plurality of threats for the simulated waypoint.

4. The method as defined in claim 3, wherein the simulated waypoint is a first simulated waypoint of a plurality of simulated waypoints, the method further comprising:
repeating steps (c) through (j) for each of the plurality of threats, for each other of the plurality of simulated waypoints.

5. The method as defined in claim 1, wherein the threat is a first threat of a plurality of threats, wherein the simulated waypoint is a first simulated waypoint of a plurality of simulated waypoints, and wherein the method provides for:
computing dynamic detection probabilities from each of the plurality of threats at each of the plurality of simulated waypoints.

6. The method as defined in claim 1, further comprising the step of:
performing a new flight path algorithm to identify a flight path to the candidate waypoint of the plurality of candidate waypoints providing a lowest probability of threat detection value of the plurality candidate waypoints.

7. The method as defined in claim 6, wherein the threat is a first threat of a plurality of threats, the method further comprising the steps of:
recalculating ownship position for the candidate waypoint; and
repeating steps(d), (e), (i), and (j) for each of the plurality of threats.

8. The method as defined in claim 1, wherein the threat is a first single threat of the plurality of threats, the method further comprising:
repeating steps (d) through (f) for each other of the of the plurality of threats for the simulated waypoint to form a plurality of sets or threat location points;
identifying a plurality of the threat location points that can be represented by a second single threat location;
forming a threat cluster that represents the plurality of the threat location points as the second single threat; and
computing a centroid for the threat cluster, a longest distance between the centroid and the respective threat location point of the threat cluster corresponding thereto defining a maximum value, and a shortest distance between the centroid and the respective threat location point of the threat duster corresponding thereto defining a minimum value.

9. The method as defined in claim 8, further comprising:
performing the following after step (c) and before step (i) for the second single threat representing the formed threat cluster:
computing a line of sight LOS vector from the location of the simulated waypoint to a location of each of the following:
the centroid,
computing a probability of threat detection using each of the computed LOS vectors for the second single threat, and
identifying a maximum probability of threat detection value from among each probability of threat detection determined using the computed LOS vectors for the second single threat; and
repeating steps (i) and (j) utilizing the identified maximum probability of threat detection value.

10. The method as defined in claim 8, wherein the plurality of threat location points include latitude, longitude, and altitude of each of a corresponding plurality of threat ground points, the method further comprising:
identifying an optimum geometric shape of a plurality of possible geometric shapes representing the plurality of ground points, the optimum geometric shape having minimum computed area when compared to an area of each other of the plurality of possible geometric shapes to reflect an area of the centroid.

11. The method as defined in claim 1, wherein the threat is a first single threat, the method further comprising;
identifying a plurality of additional threats from the throat data that can be represented by a second single threat;
forming a threat cluster that represents the plurality of additional threats as the second single threat; and
computing a centroid for the threat cluster, a longest distance between the centroid and the respective additional threat of the threat cluster corresponding thereto donning a maximum value, and a shortest distance between the centroid and the respective additional threat of the threat cluster corresponding thereto defining a minimum value.

12. The method as defined in claim 11, further comprising:
performing the following after step (c) and before step (i) for the second single threat representing the formed threat cluster:
computing a line of sight LOS vector from the location of the simulated waypoint to a location of each of the following:
the centroid,
computing a probability of threat detection using each of the computed LOS vectors for the second single threat, and
identifying a maximum probability of threat detection value from among each probability of threat detection determined using the computed LOS vectors for the second single threat; and
repeating steps (i) and (j).

13. The method of claim 1, wherein the step of creating LOS vectors creases the following LOS vectors: (1) LOSnew((Az+0.003×Az), Elm, Rngm), and (2) LOSnew((Az−0.003×Az), Elm, Rngm), wherein Elm is a measured value for an elevation parameter and Rnmg is the measured value for a slant range parameter.

* * * * *